Jan. 7, 1969 J. W. I. HEIJNIS 3,420,185
GEAR PUMP
Filed March 4, 1966

INVENTOR
James W. I. Heijnis

BY Stevens, Davis, Miller & Mosher
ATTORNEYS

United States Patent Office 3,420,185
Patented Jan. 7, 1969

3,420,185
GEAR PUMP
James W. I. Heijnis, Arnhem, Netherlands, assignor to American Enka Corporation, Enka, N.C., a corporation of Delaware
Filed Mar. 4, 1966, Ser. No. 531,851
Claims priority, application Netherlands, Mar. 5, 1965, 6502896
U.S. Cl. 103—126        6 Claims
Int. Cl. F04c 1/04; F01c 1/18

ABSTRACT OF THE DISCLOSURE

A gear pump comprising a driving gear and a driven gear positioned within a pump housing, each of the gears having an axial clearance between the sides of the housing. The axial clearance of the driven gear is greater than the axial clearance of the driving gear to the extent that the gear wear during the operation of the pump is substantially reduced without considerably increasing leakage of liquid around the gears.

---

This invention relates to a gear pump having a driving gear and a driven gear positioned in a pump housing, with the axial clearances between the gears and the housing being in such proportions that gear wear is reduced considerably without excessively increasing the leakage of liquid around the gears.

Gear pumps having an axial clearance along the sides of the driving gear and the driven gear within a housing whereby a part of the liquid to be pumped can penetrate between the sides of the gears and the housing to act as a lubricant, are known. In such pumps the friction between the sides of the gears and the parallel side plates of the pump housing is substantially reduced. As a result, the force which the driving gear must exert on the driven gear in order to rotate the latter may be smaller than if there should be substantially no clearance.

However, the magnitude of the axial clearance between the gears and the pump housing should not exceed certain limits, since an increase in the clearance is attended not only with an increase in leakage of liquid but also with an increase in the spread in the pump delivery; which spread occurs if the discharge pressure varies. If the gear pump is used as a metering pump in a spinning process, this spread must be maintained within relatively narrow limits.

As a result, it is not possible to increase the axial clearance to such a magnitude as would be desirable to substantially increase the life of the spinning pumps.

In fact, provision of a clearance of such a magnitude that leakage is still acceptable, is normally accompanied with considerable wear on the faces of the gear teeth.

Advantageously, it has now been found that gear pumps of this type can be made so that gear wear is further reduced and so that considerable increase in leakage is prevented.

This invention contemplates a gear pump having a driving gear and a driven gear operably positioned in a pump housing, each of the gears having an axial clearance between the sides of the housing, the axial clearance of the driven gear being greater than the axial clearance of the driving gear to the extent that the gear wear is substantially reduced without considerably increasing the leakage of liquid around the gears. More particularly, this invention is directed to a gear pump for viscous liquids, e.g., a viscose spinning pump or the like, having a driving gear and a driven gear enclosed within the parallel side plates of a housing in which the ratio of the axial clearance of the driven gear to that of the driving gear is in the range of from 1.2 to 3.0 and is preferably about 2.

In accordance with this invention, the force which the driving gear exerts on the driven gear in order to rotate it may be considerably smaller than that required to drive the heretofore known spinning pumps, and yet the spread in the pump delivery at varying discharge pressures remains within acceptable limits.

The most favorable proportion between leakage and wear is obtained with those gear pumps of this invention having a delivery of 6 cubic centimeters per revolution of the driven gear in the spinning of viscose, if the clearance between the gears and the side plates of the pump housing are 14 to 15$\mu$ for the driving gear, and 20 to 30$\mu$, preferably about 25$\mu$, for the driven gear, the letter $\mu$ referring to a unit of length, the micron.

In contrast, in known spinning pumps if employed with the usual r.p.m. of the pump shaft for metering viscose having a viscosity of 50 to 100 poises, an axial clearance of 19$\mu$ is often used for both gears.

According to this invention, particularly favorable results, i.e., improved duration of life and reduced leakage, are obtained if the sum of the axial clearances is maintained at about the same value as in the known gear pumps, and the ratio of the clearance of the driven gear to that of the driving gear is kept within the range of 1.2 to 3.0.

Thus, it will be appreciated that with the gear pumps of this invention, the axial clearance for the driving gear is smaller than has been used in usual practice; whereas the axial clearance for the driven gear is larger.

With viscose spinning pumps having a lower or a higher delivery, as described above, and consequently of a smaller or larger construction, the clearances will be smaller or larger, accordingly. Thus, for viscose spinning pumps of this invention having a delivery of 0.6 cubic centimeter per revolution, the clearance for the driving gear is preferably chosen within the range 7 to 9$\mu$ and the clearance for the driven gear within the range 11 to 13$\mu$.

The invention will be further described with reference to the accompanying drawings, which schematically shows, by way of example, one embodiment of the pump according to the invention.

Figure 1:
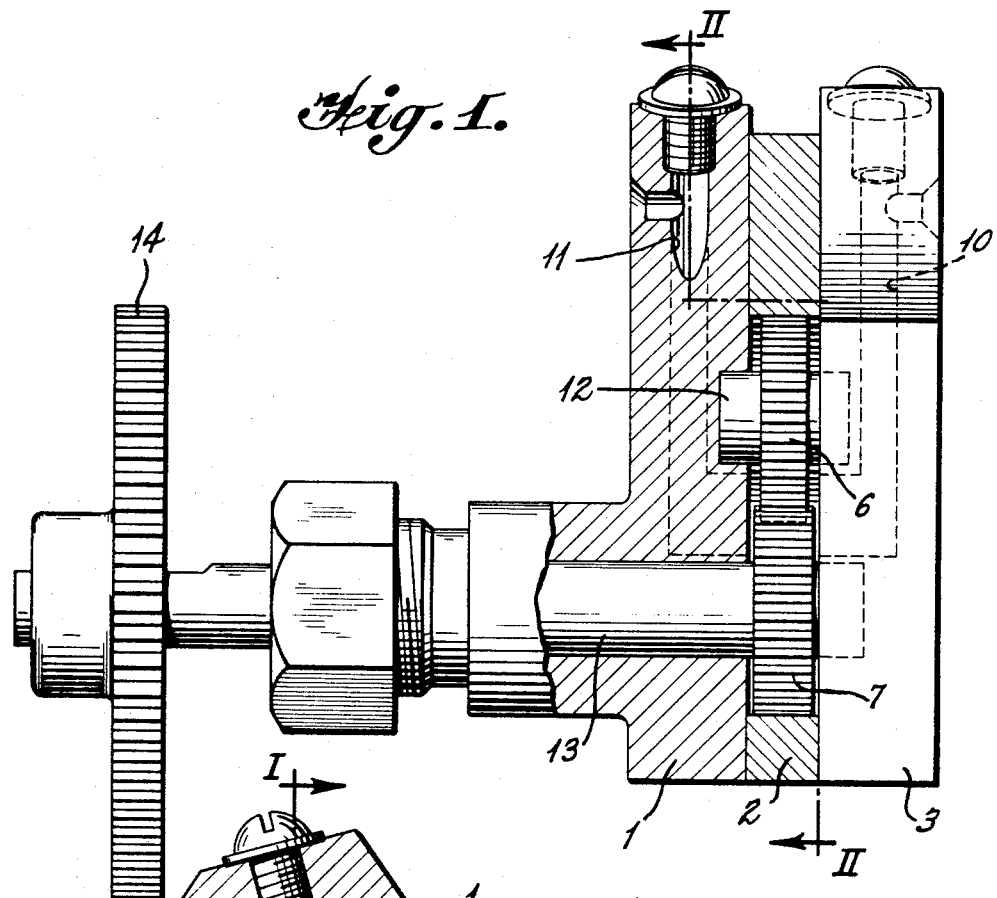
FIGURE 1 shows the embodiment partly in side elevation and partly in section along the line I—I of FIGURE 2.
Figure 2:
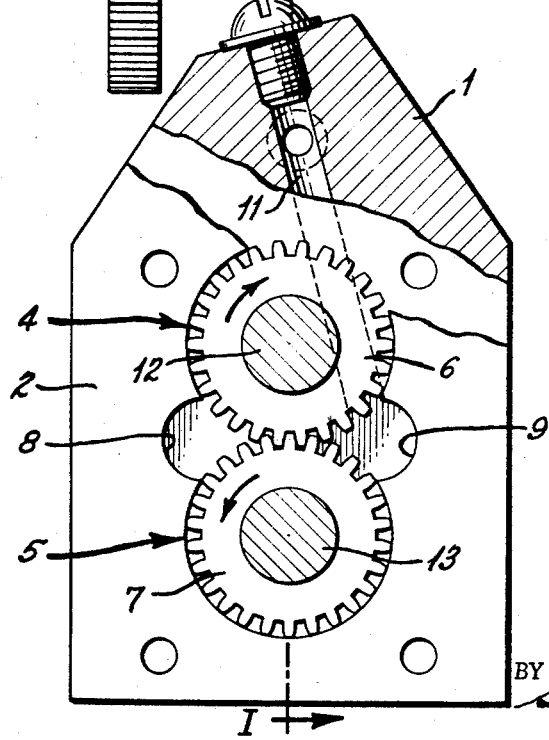
FIGURE 2 shows part of the same embodiment partly in section along the line II—II in FIGURE 1.

The pump shown in the figures has a housing composed of two parallel side plates 1 and 3 which are separated by a center plate 2. Two circular openings 4 and 5 are provided in the center plate 2 for accommodating the two intermeshing gears 6 and 7, respectively. These circular openings 4 and 5 are connected to a feed chamber 8 and a discharge chamber 9, respectively; namely, where the circular openings 4 and 5 communicate with each other.

Liquid may be supplied to the feed chamber 8 via an inlet channel 10, and the liquid pumped may leave the discharge chamber 9 via a discharge channel 11. The gear 6 is mounted on a shaft 12, which is freely rotatable in the side plates 1 and 3 of the pump housing. The gear 7, however, is fixedly mounted on a shaft 13 which projects from the pump housing. Shaft 13 may be driven by the gear 14 which is mounted thereon.

The gears 6 and 7 are so enclosed between the side plates 1 and 3 that some axial clearance is left on each side of the gears. The axial clearance i.e., the sum or total of the clearances on each side of the driven gear 6 is larger than that of the driving gear 7. Owing to the axial clearance between the sides of the gears 6 and 7 and the parallel plates 1 and 3, part of the liquid to be pumped may penetrate between the sides of gears 6 and 7 and the side plates 1 and 3 where the liquid may act as a lubricant. As a result, the frictional forces on the gears are reduced. This is of special importance for the driven gear 6. The force that must be exerted by the gear 7 to drive the gear 6, and which governs the wear of the gear teeth is dependent not only on the discharge pressure, but also on the frictional forces on gear 16.

According to this invention the clearance of the driven gear 6 is chosen to be large enough that the driving force causes extremely little wear of the teeth, so that the pumps have a long life. On the other hand, with the driving gear the friction forces need not, in connection with the wear of the gear teeth, be as small as possible. Here the wear of the gear sides plays a substantial role. Advantageously, it has been found that in order to maintain a low degree of wear on the gears, the axial clearance of the driving gear may be smaller than that of the driven gear.

In accordance with the described embodiment of the invention, a viscose spinning pump was constructed for the manufacture of tire yarns having a delivery of 6 cubic centimeters per revolution. In this construction a total clearance of 14μ was provided for the drving gear, and a larger total clearance, namely, of 25μ was provided between the driven gear and the side plates of the pump housing.

It will be appreciated that these clearances will have to be changed if the dimensions of the pumps are enlarged i.e., to provide an increase in the discharge capacity or the like, or if the operating conditions, such as the viscosity of the liquid and the r.p.m. of the pump are modified. For instance, as previously noted, the axial clearances will have to be increased if the pumps have larger dimensions, and also if the viscosity of the liquids is higher than normal, e.g. above about 100 poises.

It will also be appreciated that in the normal manufacture of gear pumps in which the driving gear is designed to have the same axial clearance as the driven gear, the production series will include pumps in which the two gears may have unequal thicknesses (this is caused by the tolerances of the gears allowed in the manufacture thereof). Accordingly, in such cases the axial clearance of the driven gear will only be larger than that of the driving gear within the tolerance limits and not as contemplated by this invention. These differences are never so large that the ratio between the axial clearances reaches the ratios required by this invention, i.e., about 1.2 to 3.0.

The following example is illustrative of the results obtained with the improved gear pumps of this invention. It is not intended to be limitative of the scope of the invention.

Example

The improved results of the invention are shown in experiments with several series of pumps. The experiments are carried out with Slack and Parr 6 cubic centimeter spinning pumps of the SP99 type. The test liquid used is oil having a viscosity of 8 poises. The pump speed is 6 r.p.m. In the experiments part of the pumps are of the standard type and are not modified. In several other pumps the axial clearance of one or both gears is altered in accordance with the teachings of this invention. The experiments are carried out using various combinations of feed pressure and discharge pressure.

The results of the experiments as to the leakage observed are shown in the following table.

TABLE 1

| Series | Axial clearance in microns($\mu$) | | Leakage in cc. per atm. pressure difference (t-v>0)* | Leakage in cc. per atm. pressure difference (t-v<0)* |
| --- | --- | --- | --- | --- |
| | Driving gear | Driven gear | | |
| Experiment A: | | | | |
| 1 | About 14μ | About 19μ | 0.34 | 0.60 |
| 2 | About 19μ | do | 0.40 | 1.20 |
| Experiment B: | | | | |
| 3 | About 14μ | About 22μ | 0.46 | 1.25 |
| 4 | About 23μ | do | 0.67 | 1.70 |
| Experiment C: | | | | |
| 5 | About 14μ | About 25μ | 0.54 | 1.00 |
| 6 | About 25μ | do | 0.80 | 1.75 |
| Control series, 7 | About 14μ | About 14μ | 0.22 | 0.50 |

* v—feed pressure, t—discharge pressure.

These results and the wear observed show that the pumps used in Experiment C, series 5 are particularly suitable as metering pumps because the difference between the leakage in the discharge pressure zone and that in the feed pressure zone is smaller (0.46) than with other gear pumps showing similarly little wear; note for instance, the results of Experiment B, series 4 (1.03), or of Experiment B, series 3 (0.79).

With the pumps used in Experiment A, series 1, this difference in leakage is even smaller (0.26), but the wear of the pumps in this experiment is higher. However, the wear of the pumps in this experiment is lower than that of the pumps of the control series.

The increase in the spread at varying pressures of the pump delivery as a result of increasing the axial clearances is not expressed in the table, but the spread is found to be within an acceptable range for the pumps of this invention.

While novel features of the invention have been shown and described and are pointed out in the appended claims, it is to be understood that various omissions, substitutions and changes in construction and arrangements of the features shown and described may be made by those skilled in the art without departing from the spirit and scope of the invention.

What is claimed is:

1. A gear pump comprising a driving gear and a driven gear operably positioned within a pump housing, each of said gears having an axial clearance between the sides of the housing, the total axial clearance of the driven gear being greater than the total axial clearance of the driving gear to the extent that gear wear is substantially reduced, without considerably increasing leakage of liquid around the gears.

2. The gear pump of claim 1 in which said gears are enclosed between parallel side plates of said housing.

3. The gear pump of claim 1 in which the ratio of the total clearance of the driven gear to that of the driving gear is within the range of from 1.2 to 3.0.

4. The gear pump of claim 1 in which the ratio of the total clearance of the driven gear to that of the driving gear is about 2.

5. The gear pump of claim 1 comprising a viscose spinning pump having a delivery of 6 cubic centimeters per revolution of the driving gear in which the total axial clearance of the driving gear is from about 14 to 15μ and the total axial clearance of the driven gear is from about 20 to 30μ.

6. The gear pump of claim 1 comprising a viscose spinning pump having a delivery of 0.6 cubic centimeter per revolution of the driving gear in which the total axial clearance of the driving gear is from about 7 to 9μ and the total axial clearance of the driven gear is from about 11 to 13μ.

(References on following page)

References Cited

UNITED STATES PATENTS

| | | | |
|---|---|---|---|
| 2,236,980 | 3/1941 | Ungar | 103—126 |
| 2,319,374 | 5/1943 | Ungar | 103—126 |
| 2,626,570 | 1/1953 | Armington et al. | 103—126 |
| 2,823,616 | 2/1958 | Toyoda | 103—126 |
| 2,871,794 | 2/1959 | Mosbacher | 103—126 |
| 2,997,960 | 8/1961 | Kimijima et al. | 103—126 |

FOREIGN PATENTS

| | | |
|---|---|---|
| 5,747 | 3/1893 | Great Britain. |
| 894,227 | 12/1944 | France. |

FRED C. MATTERN, Jr., *Primary Examiner.*

T. R. HAMPSHIRE, *Assistant Examiner.*

U.S. Cl. X.R.

91—87